United States Patent
Iida

[15] 3,663,093
[45] May 16, 1972

[54] VARIFOCAL LENS MOUNT WITH DEFORMABLE ANTI-FRICTION COATINGS

[72] Inventor: Yozo Iida, Tokyo, Japan
[73] Assignee: Nippon Kogaku K.K., Tokyo, Japan
[22] Filed: July 29, 1970
[21] Appl. No.: 59,144

[30] Foreign Application Priority Data

Aug. 8, 1969 Japan..................................44/74826

[52] U.S. Cl..............................350/187, 350/44, 350/255
[51] Int. Cl. ...............................................................G02b 7/10
[58] Field of Search.......................350/69, 44, 187, 252, 255

[56] References Cited

UNITED STATES PATENTS

| | | | |
|---|---|---|---|
| 3,168,610 | 2/1965 | Kende | 350/187 |
| 2,956,492 | 10/1960 | Quick | 350/252 |
| 2,932,237 | 4/1960 | Back | 350/255 |

Primary Examiner—David Schonberg
Assistant Examiner—Ronald J. Stern
Attorney—Harry G. Shapiro

[57] ABSTRACT

A varifocal lens including a cam cylinder rotatably mounted on a stationary housing, and lenses held in lens barrels slideably positioned within the stationary housing to vary the focal length of the varifocal lens. Cam followers to position the lens barrels extend from the lens barrels to guide grooves in the stationary housing and cam grooves in the cam cylinders. The sliding surfaces of the lens barrels and the cam followers are provided with a layer of resilient material having a low coefficient of friction. The dimensions of the lens barrel sliding surfaces and the cam followers are made larger than the dimensions of the members which they contact, so that the resilient material will be slightly deformed and thereby take up the play between the lens barrels and cam followers and their respective coacting members.

6 Claims, 4 Drawing Figures

PATENTED MAY 16 1972
3,663,093
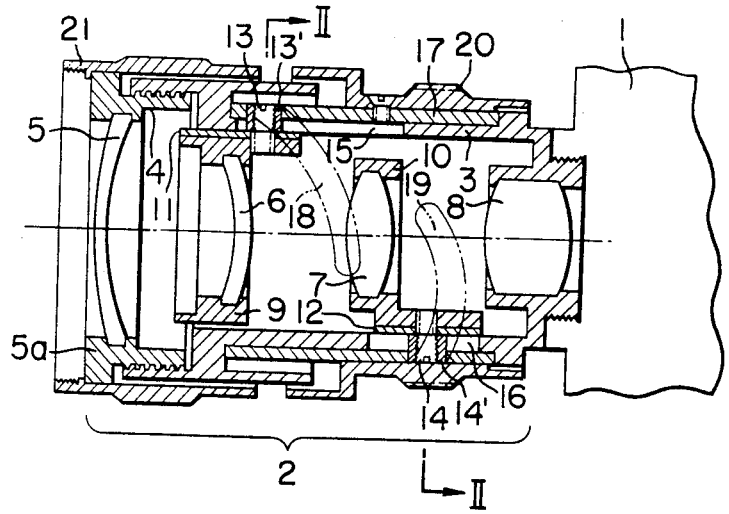
FIG. 1
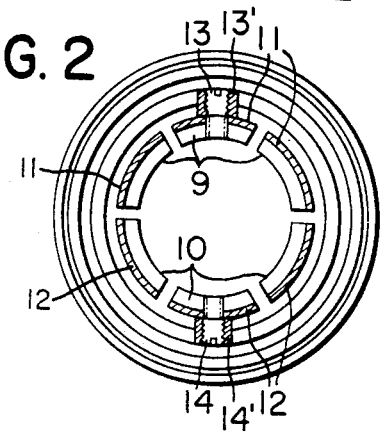
FIG. 2
FIG. 3          FIG. 4
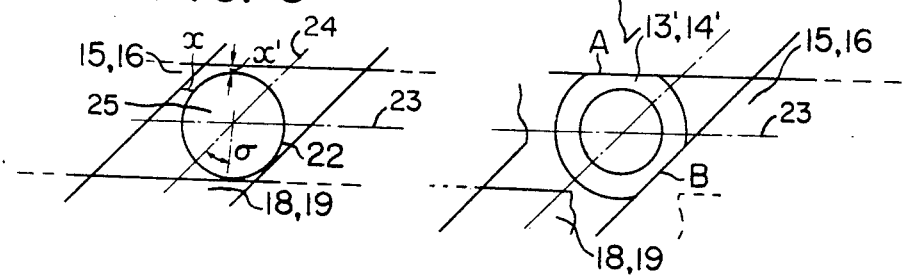
INVENTOR
YOZO IIDA
BY Harry G. Shapiro
ATTORNEY

VARIFOCAL LENS MOUNT WITH DEFORMABLE ANTI-FRICTION COATINGS

FIELD OF THE INVENTION

This invention relates to a lens mount for a varifocal lens assembly which assembly varies its focal length by slidably moving the lens mount along the optical axis of the assembly.

DESCRIPTION OF THE PRIOR ART

The zooming mechanism for a varifocal lens usually consists of a cam cylinder rotatably mounted on a stationary lens housing. Lenses to vary the focal length are held in movable lens barrels mounted in the stationary lens housing. Pins or cam followers extend from the movable lens barrels through guide grooves in the housing and into cam grooves in the cam cylinder, so that rotation of the cam cylinder will move the lens barrels axially within the stationary housing, thereby changing the focal length of the varifocal lens.

In order to reduce the torque necessary to rotate the cam cylinder, the frictional force between the cam grooves and cam followers in minimized by using a roller instead of a pin for the cam follower. Also, the slope of the cam groove is made as small as possible.

However, the slope of the cam groove cannot be made too small without requiring either excessive turning of the cam cylinder or unduly complex mechanism to position the lens barrels within the housing. Further, when a roller cam follower is used, there is play not only between the roller and the cam groove, but also between the roller and its shaft. As the slope of the cam groove becomes greater, this play increases in the direction of the optical axis of the varifocal lens. This play along the optical axis between the cam follower and cam groove may prevent stable movement of the barrel and produce an error in image position.

SUMMARY OF THE INVENTION

The principal object of the present invention is to eliminate such defects as described above. According to one aspect of the present invention, the sliding parts of the zooming mechanism are made of a synthetic resilient resin having a low coefficient of friction ( $\mu$ = less than 0.3 ). Also, the slide members to be fitted into the cam groove and the stationary lens housing have outer diameters which are larger than the width of the cam groove and the inner diameter of the stationary lens housing respectively. Therefore, there exists no play between the cam follower and the cam groove and between the movable barrel and the stationary lens housing, so that the movable barrels may be moved smoothly with a higher degree of accuracy.

BRIEF DESCRIPTION OF THE DRAWING

FIG. 1 is a longitudinal sectional view of a zoom lens assembly embodying the present invention;

FIG. 2 is a sectional view looking in the direction indicated by the arrows II in FIG. 1;

FIG. 3 is a schematic representation of the relationship between the conventional guide groove, cam groove and cam follower; and FIG. 4 is a schematic representation of the relationship between the guide groove, cam groove and cam follower in accordance with the present invention.

DESCRIPTION OF THE PREFERRED EMBODIMENT

Referring to FIG. 1, an objective lens 2 is mounted upon a camera 1. A front or focus lens mount 5a mounting a front or focus lens 5 is in threaded engagement at 4 with a stationary lens housing 3 of the objective lens 2 so that the focus lens 5 may be axially moved. Within the housing 3 are disposed lens groups 6 and 7 in such a manner that they may be moved toward or away from each other so as to continuously vary the focal length and to thereby vary the degree of magnification of the varifocal lens. A stationary lens group 8 is mounted coaxially of the above-mentioned lenses 5, 6 and 7 in the housing 3.

Movable lens groups 6 and 7 are mounted upon movable lens barrels 9 and 10, respectively, which slide in the stationary housing 3. A resilient synthetic resin having a small coefficient of friction (i.e. less than 0.3), such a tetraflouroethylene resin, is used to form slide members 11 and 12 which are fixed to the outer peripheral surfaces of the movable barrels 9 and 10 respectively. (See FIG. 2). It should be noted that the maximum diameter of the movable barrels 9 and 10 including the slide members 11 and 12 is a few microns to 0.1mm larger than the inner diameter of the lens housing 3. The movable barrels 9 and 10 are deformably fitted into the lens housing 3 by utilizing the elastic deformation of the slide members 11 and 12 so that there is no gap or play when the movable barrels 9 ad 10 move in the lens housing 3.

Slide members 13' and 14' are formed on cam followers 13 and 14 wich extend from the movable barrels 9 and 10 respectively. These slide members are made of the same synthethic resin as the slide members 11 and 12 and have an outer diameter about a few microns to 0.3mm larger than the width of guide grooves 15 and 16 formed in the axial direction in the lens housing 3 and the cam grooves 18 and 19 formed in a cam cylinder 17. It is therefore readily seen that these cam followers 13 and 14 may be fitted into the guide grooves 15 and 16 and cam grooves 18 and 19 without any play.

The cam cylinder 17 is rotatable but not axially movable over the lens housing 3 and has the cam grooves on its periphery. Since the shape of the cam groove 18 is different from that of the cam groove 19, relative axial movement between the movable lens groups 6 and 7 is produced by rotation of the cam cylinder 17, thereby obtaining a continuously variable magnification. A varifocal ring 20 is securely fixed to the cam cylinder 17. Focusing is provided by rotating the focusing ring 21.

Since the slide members 13' and 14' are yieldingly fitted into the cam grooves 18 and 19 and into the guide grooves 15 and 16, the tolerance required in machining these grooves may be sufficiently compensated for by the deformation of the synthetic resin.

FIG. 3 illustrates the relationship between the guide grooves 15, 16, the cam grooves 18, 19 and the cam follower 22 of a conventional varifocal lens in a relatively high zoom ratio position. Because the cam follower and the cam grooves are formed of relatively non-deformable material, the manufacturing tolerances of these members which are necessitated for their proper coaction result in play X and X' between the cam follower 22 and respectively the cam grooves 18, 19 and the guide grooves 15, 16. The play X in the direction of the optical axis 23 will increase with an increase in the cam groove angle $\sigma$ formed between the line 25 perpendicular to the optical axis and the line 24 parallel to the direction of the cam groove 18,19. If the angle $\sigma$ were to increase to 90° so that the play X would become X', then the play in the direction of the optical axis would become infinite.

As shown in FIG. 4, the cam follower 13 or 14 used in the present invention has a slide member 13' or 14' respectively which forms the contacting surface of the cam follower. The slide members 13' and 14' are formed of the same type of resilient synthetic resin having a low coefficient of friction as the slide members 11 and 12. The slide members 13' and 14' of the cam followers are larger than the grooves 15 and 18 or 16 and 19 in which they travel and are deformed at points A and B in order to fit into and move in the grooves. Therefore, there will be no play at all between the slide members and the grooves during the zooming operation.

According to the present invention, play, waving, flutter, etc. of the sliding parts may prevented during zooming operation so that the constant and stable image position may be maintained. The slide members are fitted into the grooves by utilizing the elastic deformation thereof so that the parts are not required to be machined and surface-finished with a higher degree of accuracy. Therefore, the fabrication of the parts is much facilitated.

What is claimed is:

1. A lens system providing a continuously variable focal length comprising a stationary lens housing having a guide groove; a cam tube having a cam groove therein, rotatably supported about the stationary lens housing; a movable lens barrel means within and slideably supported by the stationary lens housing and including first slide member means forming the contact surface of the movable lens barrel means with the stationary lens housing; follower means extending from the movable lens barrel means to coact with the guide groove and the cam groove to move the movable lens barrel means along the guide groove upon rotation of the cam tube, the follower means including second slide member means forming the contacting surface of the follower means with the guide groove and cam groove; the first and the second slide member means being formed of a resilient material having a low coefficient of friction; the movable lens barrel means sized with relation to the stationary lens housing to require slight deformation of the first slide member means when slideably supported within the housing; and the follower means sized with relation to at least one of the guide groove and cam groove to require slight deformation of the second slide member means when coacting with the guide groove and cam groove, so that the resiliency of the first and second slide member means will take up play between the movable lens barrel means, the follower means and their respective coacting surfaces.

2. The lens systems providing a continuously variable focal length according to claim 5 wherein the first and second slide member means are formed from a material having a coefficient of friction of less than 0.3.

3. The lens system providing a continuously variable focal length according to claim 6 wherein the first and second slide member means are formed of tetrafluoroethylene resin.

4. The lens system providing a continuously variable focal length according to claim 5 further comprising a first and a second movable lens barrel means within and slideably supported by the stationary lens housing; and each movable lens barrel means including first slide member means forming the contacting the surface with the stationary lens housing.

5. The lens system providing a continuously variable focal length according to claim 8 wherein the stationary lens housing includes a first and a second guide groove; the cam tube includes a first and a second cam groove; the first movable lens barrel means includes a first follower means coacting with the first guide and cam grooves; the second movable lens barrel means includes a second follower means coacting with the second guide and cam grooves; and each of the follower means includes a second slide member means forming the contacting surface for each of the follower means with the coacting guide and cam grooves.

6. The lens system providing a continuously variable focal length according to claim 5 wherein the first slide member means is deformed not more than 0.1mm and the second slide member means is deformed not more than 0.3mm.

* * * * *